United States Patent [19]

Yang

[11] Patent Number: 5,507,455
[45] Date of Patent: Apr. 16, 1996

[54] AUTOMATIC CONTROL DEVICE FOR FLYING STATE OF REMOTE-CONTROL TOY AIRPLANE

[76] Inventor: Ro-King Yang, P.O. Box 96-173, Taipei, Taiwan

[21] Appl. No.: 174,268

[22] Filed: Dec. 28, 1993

[51] Int. Cl.⁶ .......................... B64C 13/20; G05D 1/00; A63H 30/04; G01B 11/02
[52] U.S. Cl. ..................... 244/190; 244/195; 356/356; 356/363; 446/454; 250/224
[58] Field of Search ............................... 244/189, 190, 244/195, 75 R, 76 R, 175; 356/356, 363, 375; 446/454, 456; 250/222.2, 224

[56] References Cited

U.S. PATENT DOCUMENTS

| | | | |
|---|---|---|---|
| 1,513,108 | 10/1924 | Hammond, Jr. | 244/190 |
| 2,004,460 | 6/1935 | Brockstedt | 244/189 |
| 3,171,963 | 3/1965 | Bourguignon | 446/456 |
| 3,999,074 | 12/1976 | Callaghan | 250/551 |
| 4,427,880 | 1/1984 | Kanade et al. | 250/224 |
| 5,045,843 | 9/1991 | Hansen | 340/709 |
| 5,127,733 | 7/1992 | Allgauer | 356/356 |
| 5,223,709 | 6/1993 | Pettypiece, Jr. | 250/229 |

FOREIGN PATENT DOCUMENTS

| | | | |
|---|---|---|---|
| 0311144 | 4/1989 | European Pat. Off. | 356/356 |
| 3828614 | 2/1990 | Germany | 244/189 |
| 2187650 | 9/1987 | United Kingdom | 446/456 |

*Primary Examiner*—Andres Kashnikow
*Assistant Examiner*—Virna Lissi Mojica
*Attorney, Agent, or Firm*—Bacon & Thomas

[57] ABSTRACT

The present invention relates to an automatic detector for a control device for controlling the flying state of a remote-control toy airplane, which can provide automatic correction to maintain the remote-control toy airplane in a flying state in a level or horizontal manner. The detector is a digital or analogic device located at a proper position within the housing of the airplane. The detector includes a device locating plate, fixing racks, a suspension cord, a movable light-obstructing sheet or a movable light-permeable sheet, light emitting element, and one or more detecting elements the light-obstruction sheet is swingingly mounted on the suspension that in turn is connected to the cord fixing racks. When light emitting element emits light and the airplane maintains a horizontal or level attitude, the effect of gravity on light-obstruction sheet will cause it to obstruct light. If the airplane is not horizontal, the light source will not be obstructed and will be detected by a detecting element to give signals respectively to a control unit, which will provide signals to an alternative unit whose output signal will cause the airplane to fly toward the right side or left side, to turn left or right, or to correct correcting engine thrust to maintain the airplane in an optimal flying condition.

3 Claims, 6 Drawing Sheets

AUTOMATIC CONTROL DEVICE FOR FLYING STATE OF REMOTE-CONTROL TOY AIRPLANE

FIELD OF THE INVENTION

The present invention relates to a control device for toy airplane, and particularly to an automatic control device for flying a toy airplane that may automatically correct the flying attitude of the toy airplane so as to maintain an optimal horizontal attitude. This is done by detecting the lighting, the changes in a gravity sensor and by means of emitted light source, detective lighting, light obstruction and signal transmission control.

BACKGROUND OF THE INVENTION

Generally speaking, during the operation of a remote-control toy airplane the airplane often gets damaged or even gets crushed or destroyed due to a number of factors. These include operators error; slow operator responses, inexperienced operator, poor climate conditions or air flow, or interference from external frequency sources. Furthermore, when a remote-control airplane is flying, its flying speed is extremely fast, such as when climbing, descending, making a left turn or right turn, during loops or rolls, and etc., All of these require excellent operation, judgement and quick, responsive control in order to prevent the toy airplane from getting damaged. Therefore, consumers today have to pay a high price to acquire a relatively skillful operating ability so that these factors have become a great financial burden upon consumers as well as obstacle to the play of remote-control airplane.

DETAILED DESCRIPTION OF PREFERRED EMBODIMENT

Figure 1:
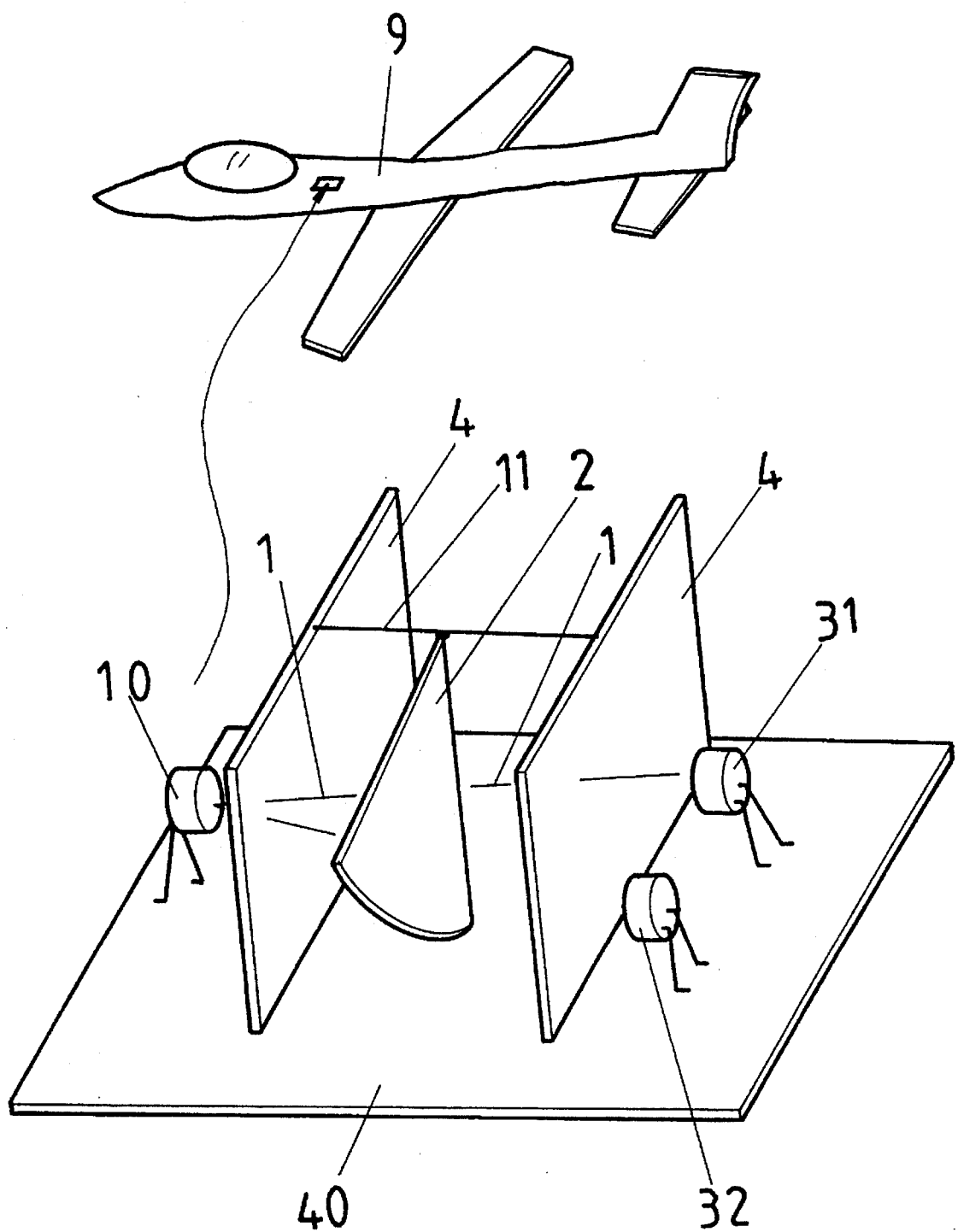
FIG. 1 is a perspective view of a preferred embodiment (digital type) according to the present invention.

Referring to FIG. 1, a detection device is mounted at a proper position of housing 9; said detective device comprising a locating or mounting plate 40, two light-permeable or transparent fixing racks 4, suspension cord 11, non-permeable movable light-obstruction sheet 2, one or more light emitting elements 10, and two or more light detecting elements 31, 32. Locating plate 40 is located in the space between the two fixing racks 4, and the suspension cord 11 supports movable light-obstruction sheet 2 its ends being secured to fixing racks 4 such as to permit the positioning of light-obstruction sheet 2 between two fixing racks 4; a light detecting element 10 is secured to the end of locating plate 40 and one of fixing racks 4. Detecting elements 31, 32 are secured to the other end of locating plate 40 and the other fixing rack 4. An emitted light beam 1 can be received by detecting elements 31, 32. During a horizontal plane attitude manner, detecting element 31 may maintain light receding state while the other detecting element 32 will not receive any light. A detecting device is thus constructed through the assembly of aforesaid elements.

Figure 2:
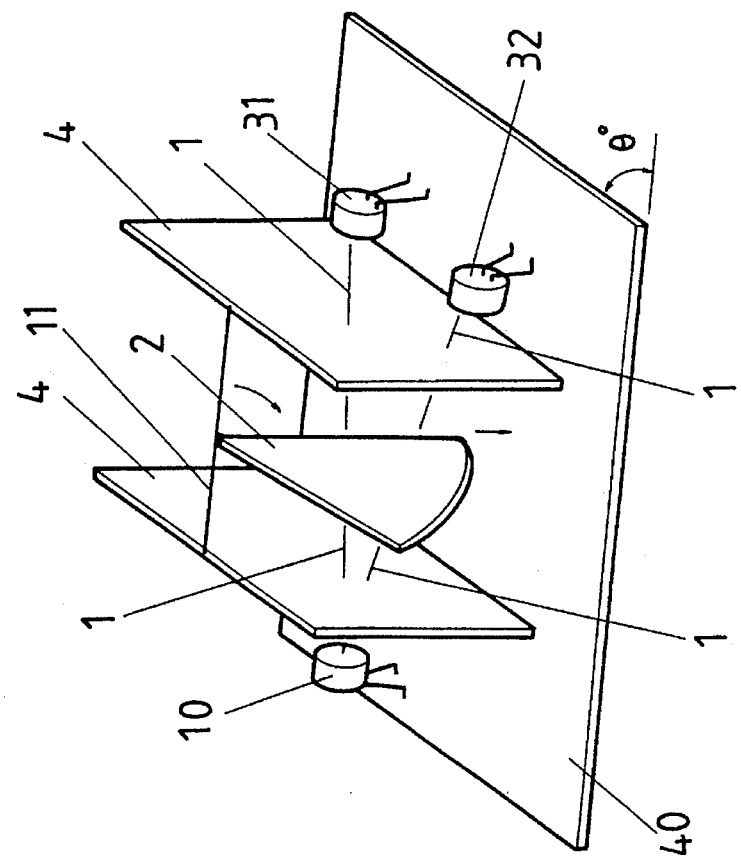
FIG. 2A is a perspective view of the device of FIG. 1 depicted in a right-turn.
FIG. 2B is a perspective view of the device of FIG. 1 depicted in a left-turn.
Figure 2:
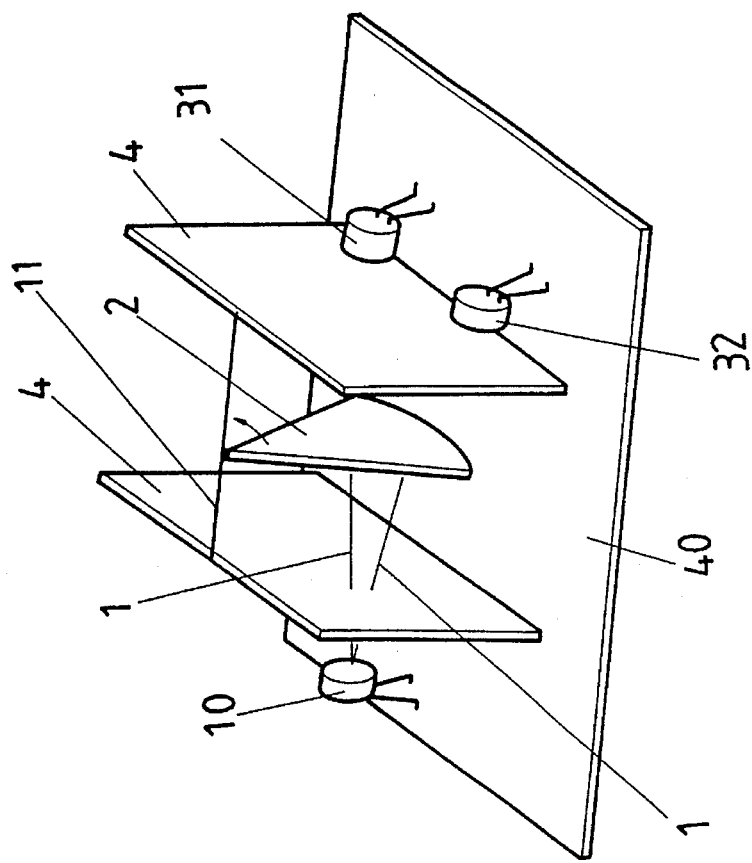
Figure 3:
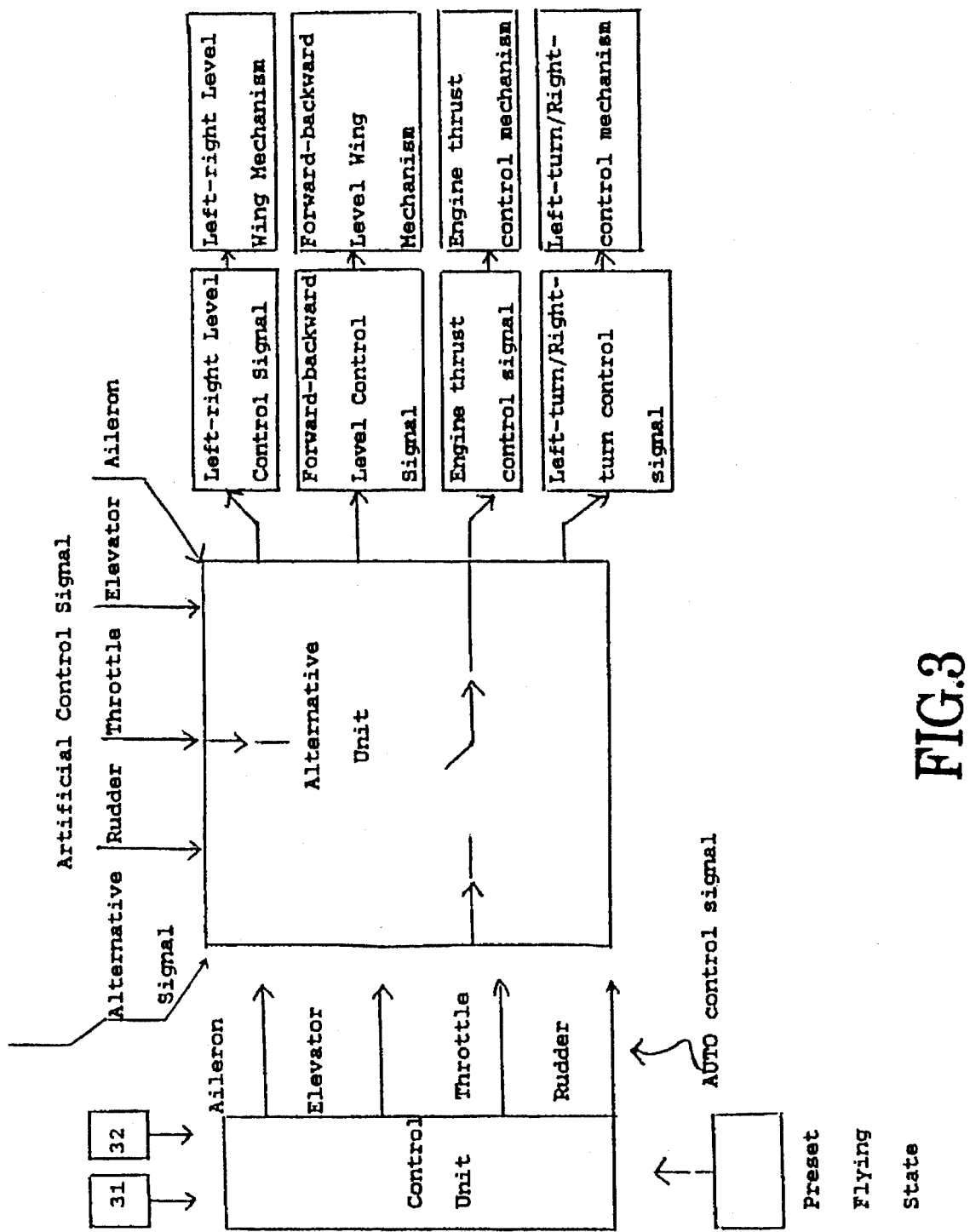
FIG. 3 is a flowchart of a control signal according to the present invention.
Figure 4:
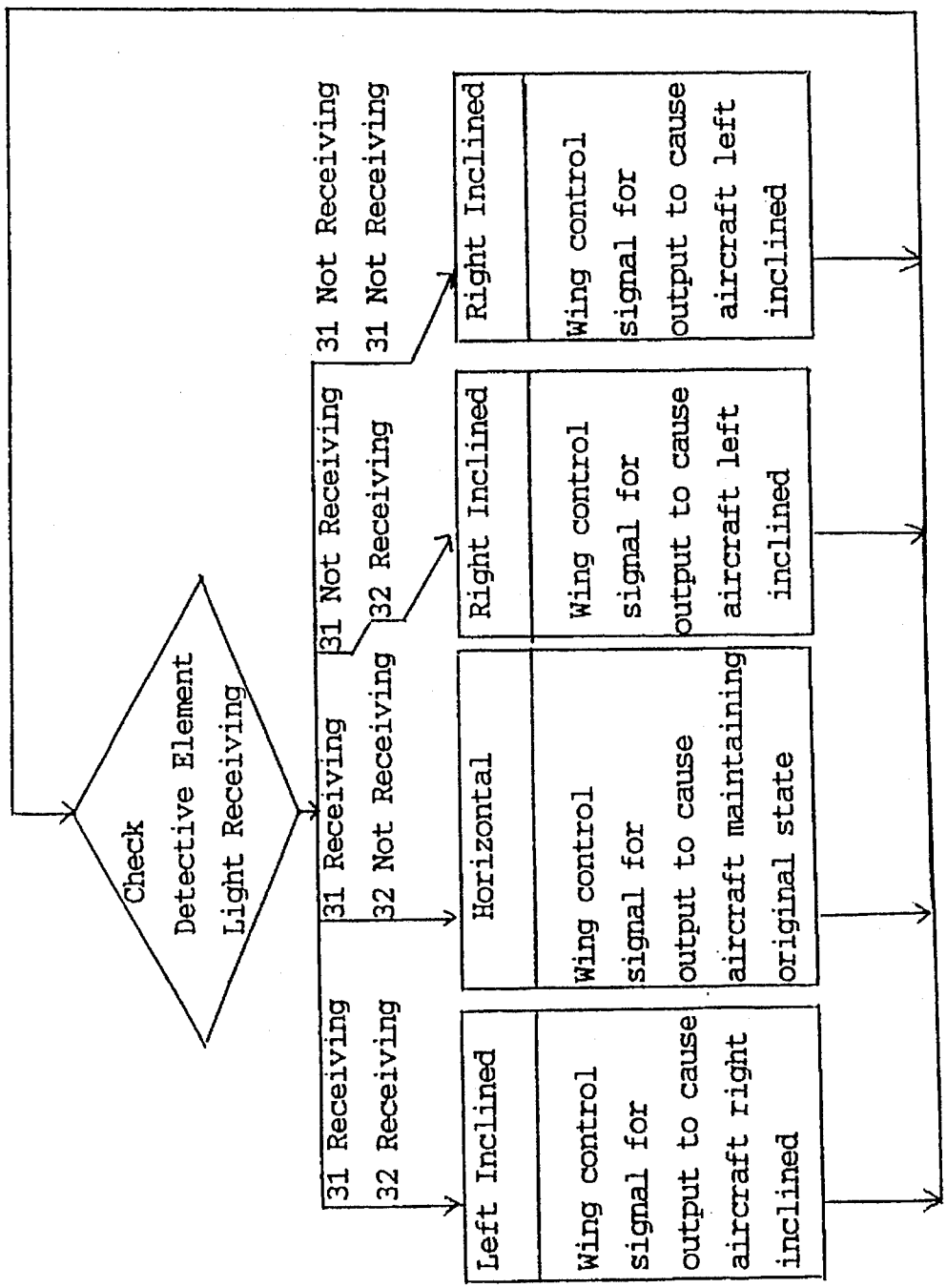
FIG. 4 is a flowchart of control action according to the present invention.

Upon understanding of the aforesaid detection device, related action control and effect will be described below. Referring to FIGS. 2, 3, 4, when the toy airplane is flying in a horizontal manner, movable light-obstruction sheet 2 has a vertical orientation with respect to fixing rack 4 and locating plate 40 when light beam 1 is emitted from light emitting element 10 it is partially obstructed by movable light-obstruction sheet 2, being receivable by light detecting element 31 only. The other detecting element 32 can not detect light source 1 because of obstruction by sheet 2 and therefore will not give a correction signal. When the toy airplane is flying in a non-horizontal manner or attitude, accordingly light beam from light emitting element may occasionally be partially blocked as moveable light-obstruction sheet 2 hung on suspension cord 11 swings back and forth because of gravitation. The effect of gravity on pendulum like movable light-obstruction sheet 2 will move it which will result in, for example, the obstruction of light source 1 to detecting element 31 while permitting light the other detecting element 32 to receive the beam; or both elements 31 and 32 will not receive it, or both elements 31 and 32 will receive it (refer to FIG. 4).

Consequently as shown in FIG. 3 detecting elements 31, 32 will give a signal to the control unit in conjunction with a present input to an alternative unit for processing with reference to the instantaneous state of the airplane. The control unit may compare it with an alternative signal, a man made control signal, an output or left-right or forward-backward horizontally, or left/right turns, or control signal for engine thrust, to control airplane's right-left horizontal wing, or forward-backward horizontal wing, or right/left turns, or engine thrust control mechanism to cause the airplane to fly toward the right side or left side obliquely wherein the effect of the automatic control to maintain the airplane in a correct horizontal manner is achieved.

Figure 5:
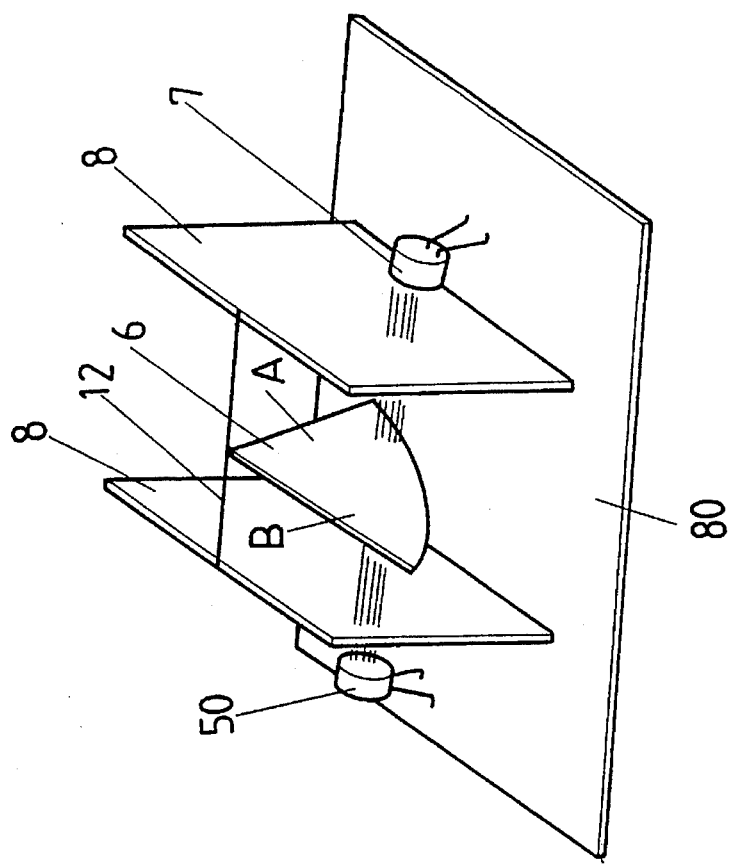
FIG. 5A is a perspective view of another embodiment of the present invention.
FIG. 5B is a perspective view of the embodiment of FIG. 5 depicted undergoing an altitude adjustment.
Figure 5:
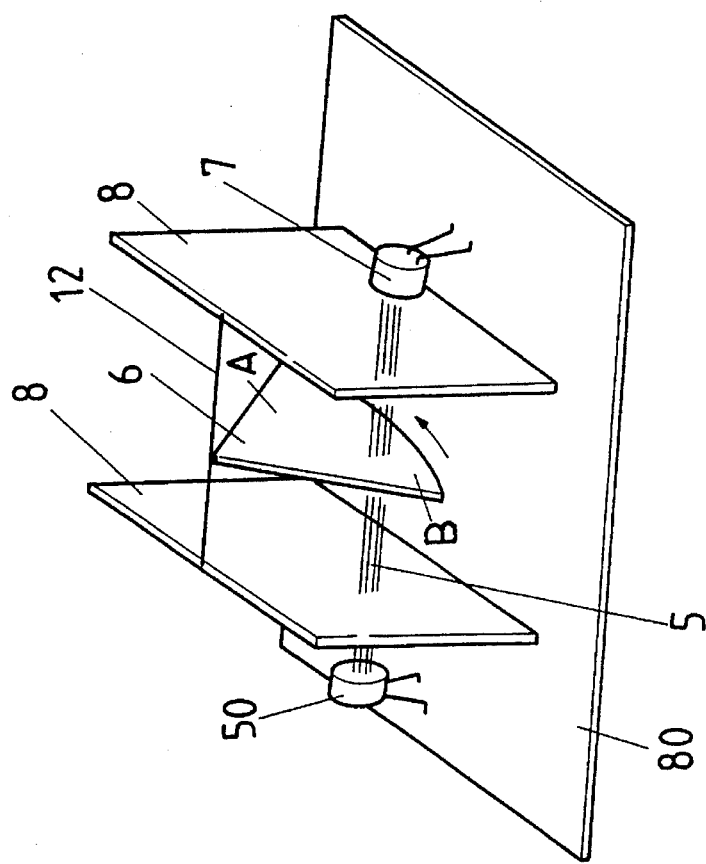
Figure 6:
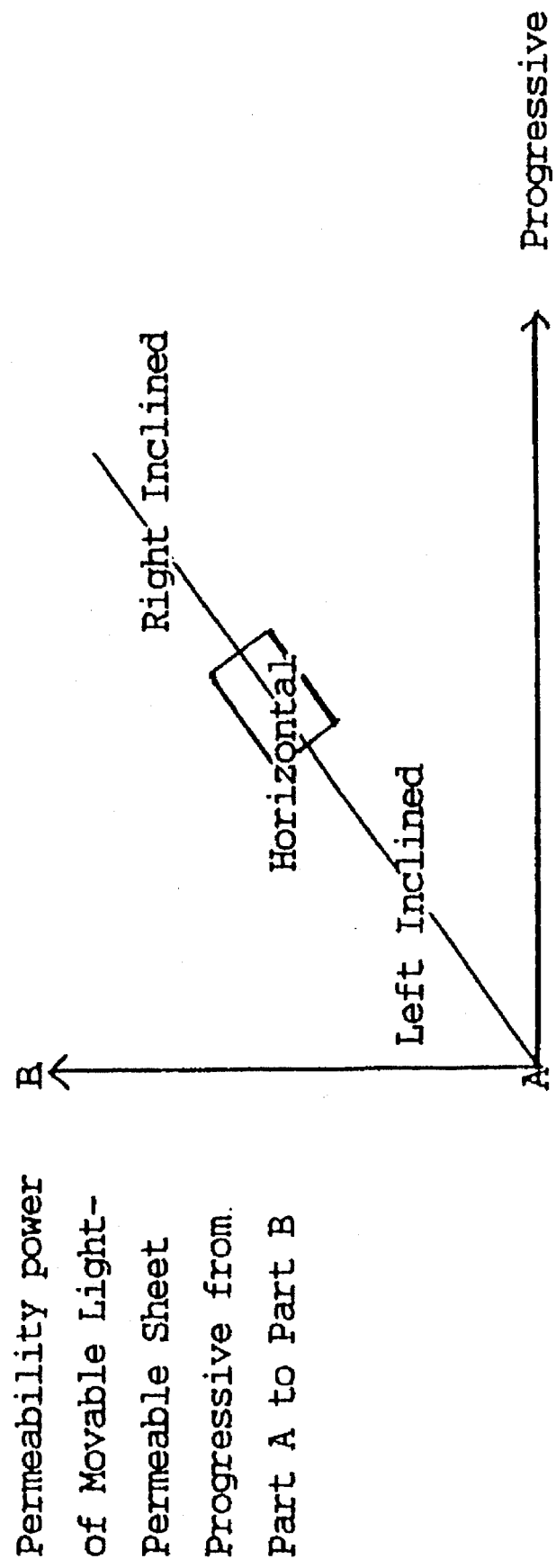
FIG. 6 is a graph of light permeability control coordinates of FIG. 5.

As the aforesaid device relates to digital control, a number of detecting elements are needed depending on the signal number. However, the present invention may also be designed as analog type. With reference to FIGS. 5, 6 wherein the construction is the same as the digital type in FIGS. 1 and 2 the detecting unit includes a locating plate 80, two light-permeable or transparent fixing racks 8, a suspension cord 12, a movable light-permeable sheet 26, a lighting emitting element 50, and one light detecting element. Moveable light-permeable sheet 6 has a light transparency or permeability that is progressive from part A to part B thereof. Detecting element 7 can detect the effect of the permeability. The related effect of motion is that when the airplane is flying in a non-horizontal manner, movable light-permeable sheet 6 will change the power of light ray 5, emitted from light emitting element 50 that is received by detecting element 7. Detecting element 7 will output a varying signal dependent upon the different light flux received. Thus, with reference to different obliqueness of sheet 5, which depends upon its position, a varied light flux signal will be detected and a varied output signal will be provided, thereby resulting in an analog signal as the control signal, as shown in FIG. 6, can be used to ensure that the airplane can be controlled and kept in an optimal flying state.

Consequently, an airplane that is flying forward, backward, leftward, rightward and obliquely can be detected by a means of a photoelectric detecting device, and through an automatic control providing quick and effective correcting action that can ensure the airplane will be timely recovered from an almost out-of-control condition caused by the operator and maintained in a present and safe flying state.

I claim:

1. An attitude detection device for an automatic control device for a remote-control toy comprising a housing; the detection device mounted within the housing and including:

locating plate, two fixing racks mounted spaced apart on said locating plate, suspension cord, light-obstruction sheet movably mounted on said suspension cord, one or more light emitting elements, and one or more detecting elements;

said light emitting element secured to one end of said locating plate proximate to one of said fixing racks said detecting element secured to the other end of said locating plate and proximate to the other of said fixing racks such that emitted light from said light emitting element is receivable by said detecting element, a light beam being obstructed or not by said movable light-obstruction sheet and said detecting element receiving light or not to detect whether or not the toy is inclining, said detecting element further providing an output signal to control the airplane.

2. An attitude detection device for an automatic control device for a remote-control toy as claimed in claim 1, wherein said movable light-obstruction sheet has a variable light permeability that is progressive from one side to another, and said detecting element being capable of detecting light flux change according to the deviation of said movable light-permeability sheet, said detecting element being capable of producing a voicable analog output control signal value to an analogic control that is effective to maintain the toy in an optimal attitude.

3. An attitude detection device for an automatic control device for a remote-control toy as claimed in claim 1, wherein said movable light-obstruction sheet is light impermeable, and wherein there are at least two light detecting elements that are spaced apart and located on said locating plate such that said light-obstruction sheet depending upon the position thereof can permit light from said light emitting element to be received by both, one of, or none of said light detecting elements.

* * * * *